P. TAYLOR.
MINE CAR WHEEL.
APPLICATION FILED APR. 15, 1920.
1,360,816.
Patented Nov. 30, 1920.
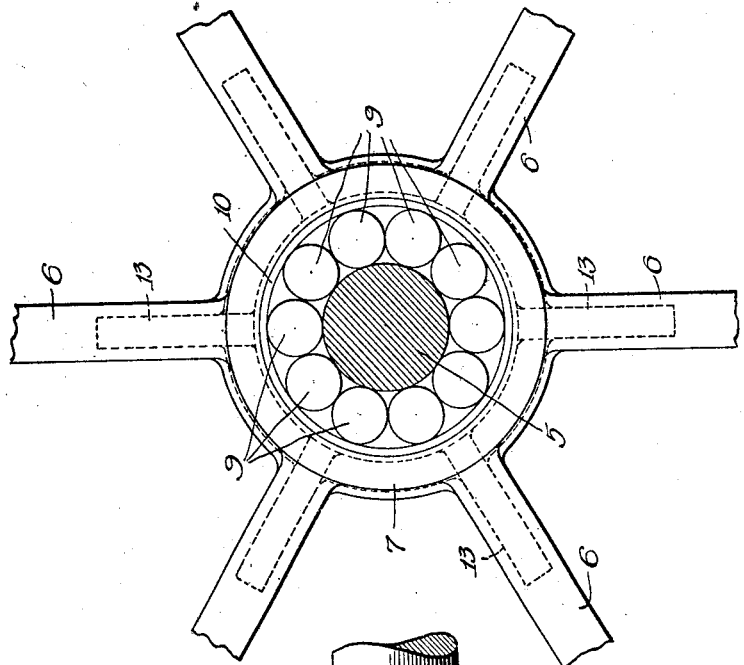
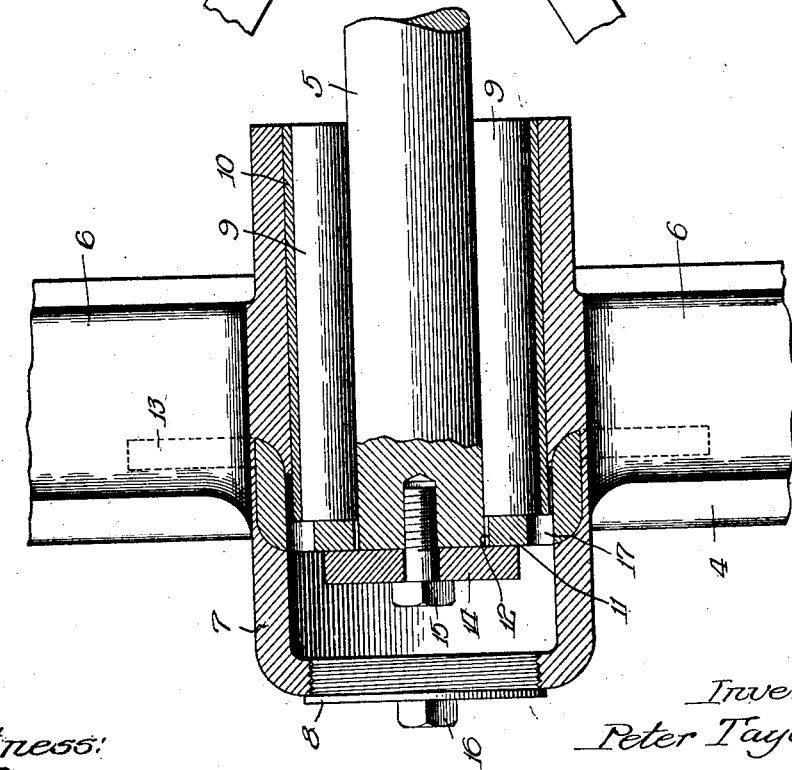
Inventor:
Peter Taylor,

UNITED STATES PATENT OFFICE.

PETER TAYLOR, OF OTTUMWA, IOWA.

MINE-CAR WHEEL.

1,360,816.　　　Specification of Letters Patent.　　Patented Nov. 30, 1920.

Application filed April 15, 1920. Serial No. 374,052.

*To all whom it may concern:*

Be it known that I, PETER TAYLOR, a citizen of the United States, residing at Ottumwa, in the county of Wapello and State of Iowa, have invented certain new and useful Improvements in Mine-Car Wheels, of which the following is a specification.

My invention relates in general to car wheels, and more particularly to wheels for mine cars.

A primary object of my invention is to provide a wheel for mine cars or the like, which may be readily removed from the end of the axle when necessary, but which will be securely retained in position upon the end of the axle during the use of the car.

A further object of my invention is to provide an improved wheel for mine cars which will comprise a chamber for a lubricant through which access may be had when necessary to disconnect the wheel from the axle and permit its removal without disassembling any of the other parts of the car.

A further object of my invention is to provide a wheel for mine cars or the like having a hollow hub reinforced by a partition secured therein when the wheel is cast.

A still further object of my invention is to provide a wheel for mine cars or the like which will be strong in construction, convenient to assemble with and remove from the axle, and durable in use.

My invention will be more fully disclosed hereinafter with reference to the accompanying drawing, in which the same is illustrated as embodied in a convenient and practical form, and in which—

Figure 1 shows a sectional view through a portion of a mine car wheel embodying the preferred form of my invention; and Fig. 2 is a front elevation of a portion of the wheel of Fig. 1, looking from the right hand end thereof.

I have shown only a portion of the axle and a portion of the wheel, as the axle may be attached to the mine car in any suitable manner.

In the drawing, 5 represents the outer end of an axle which is suitably secured to the mine car (not shown). The wheel 4, having spokes 6 and a hollow hub 7, is made of cast metal, the hub 7 being substantially cylindrical throughout its bore and in diameter greater than the diameter of the axle 5. The outer end of the hub is formed with an opening normally closed by a threaded cap 8 which may be removed to permit access to the interior of the hub. Surrounding the end of the axle within the hub 7 are roller bearings 9 which contact directly with the axle and with a bushing 10 non-rotatably secured in the hub.

At the time the wheel is cast there is inserted in the mold a spider 11 preferably made of steel, and comprising a central portion having a centrally disposed aperture 12 which is slightly greater in diameter than the diameter of the axle 5. Extending outwardly from the central portion of the spider 11 are members or fingers 13 adapted to be cast in the spokes 6 of the wheel. Preferably a single member 13 is cast in a spoke. It will then be seen that the spider becomes a rigid portion of the wheel, and as the same is made of a metal more durable than that of the wheel, it is possible to prolong the life of the wheel considerably, as none of the friction is imparted directly to the wheel proper. For removably securing the wheel 4 in operative relation with respect to the axle 5, a plate 14 is provided large enough to overlie the opening 12 in the spider and small enough to pass through the opening in the end of the hub member 7 when the cap 8 is removed. The member 14 is secured to the end of the axle 5 by a screw 15 or other suitable fastening device, the purpose being to secure the member 14 in such manner that the same may be readily applied to or removed from the axle. It will be noted that with this construction the spider engages the outer ends of the roller bearings 9 to retain the same in position around the end of the axle, and is engaged on the outside by the retaining member or plate 14 for controlling the lateral movement of the wheel on the axle.

To apply a wheel embodying my invention to an axle, the cap 8 of the hub is removed by a tool being applied to the head 16 on the cap, whereupon the retaining plate 14 may be mounted on the end of the axle 5 overlying the spider 11. When this has been accomplished the cap 8 is replaced. Before replacing the cap 8 a suitable lubricant may be inserted through the opening in the hub into the space adjacent the spider 11, from which the lubricant may pass through openings 17 to the rollers 9.

To remove a wheel embodying my invention, it is necessary only to remove the cap 8 and the securing member 15, whereupon the retaining member 14 may be removed and the wheel withdrawn from the axle. It will be observed that my invention discloses a very simple manner of attaching a mine car wheel to an axle and is such a device as may be readily made with a minimum of expense.

The arms 13 of the spider which are embedded in the spokes are preferably in a plane behind the plane of the central part of the spider 11. This permits the end of the axle to project entirely within the spokes so that all of the load is transmitted directly to the spokes of the wheel.

While I have described more or less precisely the details of construction of my invention, I do not wish to be understood as limiting myself thereto, as I contemplate changes in form and the proportion of parts and substitution of equivalents as circumstances may suggest or render expedient, without departing from the spirit of my invention.

I claim:

1. A wheel for a mine car or the like comprising a hollow hub adapted to be rotatably mounted upon an axle, a reinforcing partition extending across the hollow hub and having radial projections embedded in the spokes of the wheel, and a cap removably closing an opening in the outer end of the hub.

2. A wheel for a mine car or the like comprising a hollow hub adapted to be rotatably mounted upon an axle, a reinforcing partition extending across the hollow hub and having radial projections embedded in the spokes of the wheel, the central portion of said partition being offset outwardly beyond the plane of the spokes and having a concentric opening therein, and a cap removably closing an opening in the outer end of the hub.

3. A wheel for mine cars or the like comprising a hollow hub adapted to be rotatably mounted upon an axle, a partition across the hollow hub intermediate of its ends and having a central opening therethrough, and a cap removably closing an opening in the outer end of the hub concentric with and slightly larger than the opening in the partition.

4. The combination with a car wheel comprising a hollow hub, a partition across the hollow hub intermediate of its ends and having a central opening therethrough, of an axle extending within the hub and through the opening in said partition, retaining means removably secured to the end of the axle and overlying the outer surface of said partition, and a cap removably closing an opening in the outer end of the hub of a size to permit the insertion and removal of said retaining means.

5. The combination with a car wheel comprising a hollow hub, a reinforcing partition extending across the hollow hub and having radial projections embedded in the spokes of the wheel, and having a central opening therethrough, of an axle extending within the hub and through the opening in said partition, a retaining plate removably secured to the end of the axle and overlying the outer surface of said partition, and a cap removably closing an opening in the outer end of the hub axially alining with said retaining plate and of a size to permit the insertion and removal thereof.

6. The combination with a car wheel comprising a hollow hub, a reinforcing partition extending across the hollow hub and having radial projections embedded in the spokes of the wheel, the central portion of said partition being offset outwardly beyond the plane of the spokes and having a central opening therethrough, of an axle extending within the hub and through the opening in said partition, retaining means removably secured to the end of the axle and overlying the outer surface of said partition, a cap removably closing an opening in the outer end of the hub of a size to permit the insertion and removal of said retaining means, and anti-friction rollers interposed between the inner surface of the hub and the outer surface of the axle and engaging at their outer ends the inner surface of said partition.

Signed at Ottumwa, Iowa, this 8th day of April, 1920.

PETER TAYLOR.